Patented Jan. 15, 1946

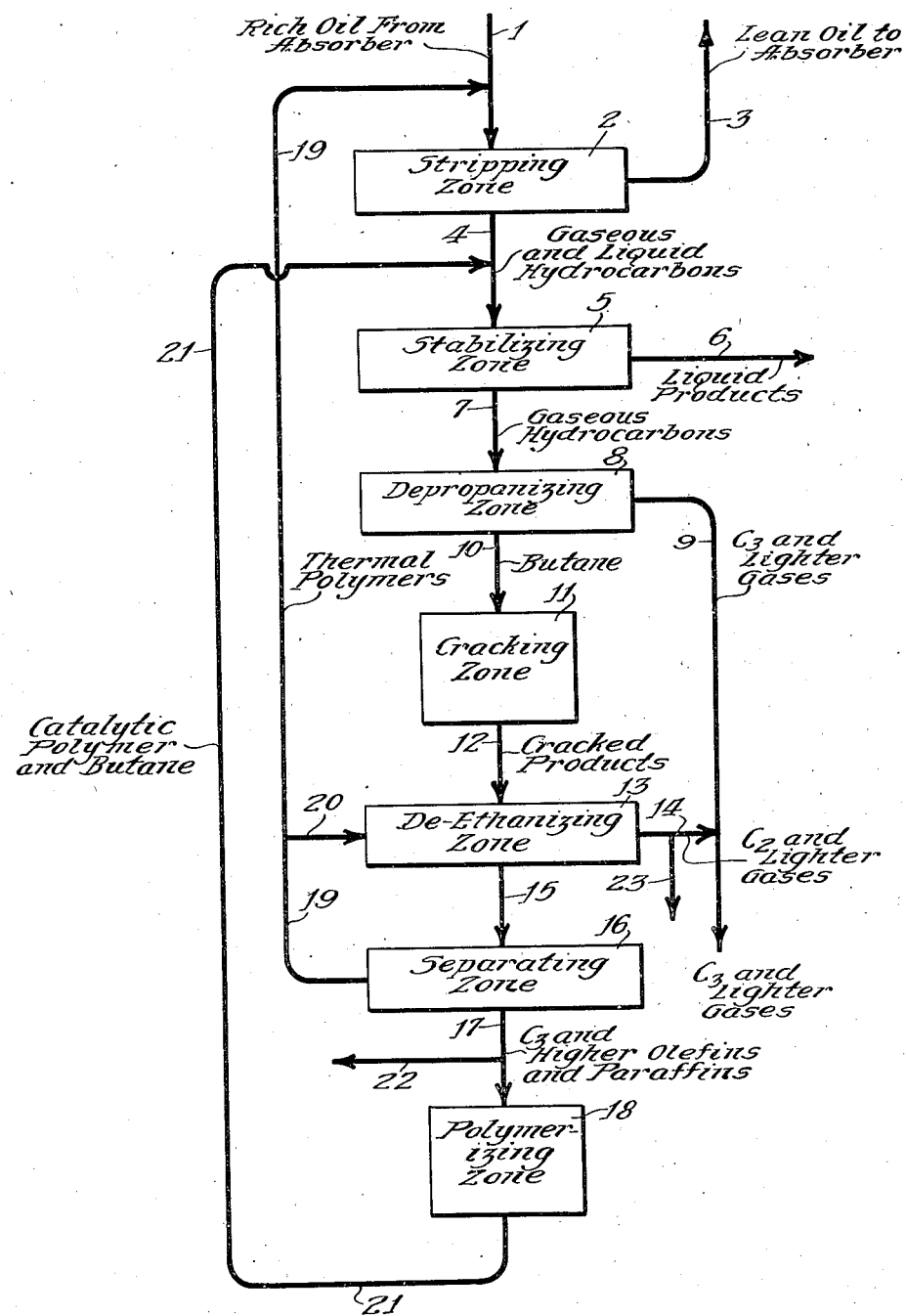

2,392,896

UNITED STATES PATENT OFFICE 2,392,896

TREATMENT OF HYDROCARBONS

Samuel S. Allender, New York, N. Y., assignor to Universal Oil Products Company, Chicago, Ill., a corporation of Delaware Application October 10, 1942, Serial No. 461,533

5 Claims. (Cl. 260—683.15)

This is a continuation-in-part of my co-pending application Serial No. 320,829, filed February 26, 1940.

This invention relates to the treatment of butanes occurring in natural and casing head gases and in a more specific sense it is concerned with a process for converting these butanes into gasoline of high octane number.

Butanes may be considered as more or less marginal compounds in respect to their desirability in ordinary gasoline, that is, a certain percentage of them is essential for sufficient vapor pressure to insure ease in starting, while an excess tends to produce vapor lock. For these reasons the total percentage of 4-carbon atom hydrocarbons is commonly adjusted in conjunction with the boiling range and vapor pressure of the other gasoline components to produce a gasoline of desirable starting characteristic according to seasonal demands. Since the amount of butane required for this purpose is less in summer than in winter there are frequent periods of over production of these gaseous hydrocarbons during which they are utilized largely for domestic and industrial fuel purposes. Therefore, it is of considerable importance at the present time to convert as much as possible of the excess butane production into gasoline, and the present invention is especially concerned with a process for accomplishing this object.

In one specific embodiment the present invention comprises a process for producing gasoline from saturated gaseous hydrocarbons occurring in natural and casing head gases which comprises fractionally distilling a mixture of absorption oil, dissolved hydrocarbons, and olefin polymers formed in the process to separate a fraction consisting of gasoline and lighter hydrocarbons from a mixture of absorption oil and relatively high boiling polymers, distilling said fraction to separate gasoline from normally gaseous hydrocarbons, fractionally distilling and depropanizing said gaseous hydrocarbons to separate $C_3$ and lighter hydrocarbons from a butane fraction, subjecting said butane fraction to cracking to form an olefin-containing gas, subjecting said gas to absorbing, stripping, and fractional distilling treatment to remove $C_2$ and lighter hydrocarbons from gases of higher molecular weight containing a substantial proportion of polymerizable olefins, contacting said gases containing polymerizable olefins with a polymerization catalyst to form a mixture of polymers and unconverted gaseous hydrocarbons, recycling said mixture to the original fractional distillation step to separate gasoline of high octane number from unconverted gases, and returning said gases to further depropanization and butane cracking treatment.

In another specific embodiment the present invention comprises a process for producing valuable olefinic products from saturated gaseous hydrocarbons occurring in natural and casing head gases which comprises fractionally distilling a mixture of absorption oil, dissolved hydrocarbons, and olefinic polymers formed in the process to separate a fraction consisting of gasoline and lighter hydrocarbons from a mixture of absorption oil and relatively high boiling polymers, distilling said fraction to separate gasoline from the normally gaseous hydrocarbons, fractionally distilling and depropanizing said gaseous hydrocarbons to separate $C_3$ and lighter hydrocarbons from the butane fraction, subjecting said butane fraction to cracking to form a product consisting of an olefin-containing gas and olefinic polymers, subjecting said product to distillation to separate it into fractions containing $C_2$ substantial portions of which are olefinic and lighter gases, gases containing a substantial portion of olefins of higher molecular weight and a heavier fraction containing olefinic polymers, returning the latter to the first fractional distillation step and separately recovering the gases containing a substantial portion of olefins of higher molecular weight and the fraction containing $C_2$ substantial portions of which are olefinic and lighter gases.

The process of this invention yields a hydrocarbon material of high octane number useful as blending fluid to increase the antiknock value of fuels inferior in this respect. This invention involves the production of polymerizable olefins by butane cracking or pyrolysis followed by catalytic polymerization to normally liquid products and return of said polymer products to fractional distillation in the stripping and distilling columns employed also for separating butanes and higher hydrocarbons from the absorption oil.

The process of this invention may also be employed for the production of olefinic material which is much in demand for use in alkylation processes and for processes for the production of butadiene and other materials for manufacturing synthetic rubber. For example butenes may be dehydrogenated to produce butadiene and ethylene may be employed to alkylate benzene for the production of ethylbenzene from which styrene may be produced. Also the olefins produced may be employed in various alkylation processes for the production of blending materials desirable for use in aviation motor fuels.

Cracking of butane to produce butenes in admixture with some propene, ethylene, unconverted butane, and lighter gaseous paraffins is preferably carried out in tubular reactors at a temperature in the approximate range of 900–1200° F. under a pressure of the order of 200–1000 pounds per square inch using an average time of contact in the approximate range of 10–60 seconds. The tubular reactor or heater is so designed that in the time during which butane is cracked there is produced an optimum yield of butenes and relatively minor amounts of propene utilizable for polymerization to normally liquid mono-olefins of gasoline boiling range and high octane number. Also the cracking treatment usually produces certain amounts of normally liquid aromatic and oleofinic hydrocarbons commonly referred to as pyrolytic polymers which may be utilized as absorption oil in the separation of $C_2$ and lighter hydrocarbons from $C_3$ and higher olefin-containing hydrocarbons, the latter utilizable as charging stock for polymerization, alkylation, etc.

Polymerization of gaseous olefins formed by cracking of butane may be effected at a temperature in the approximate range of 250–550° F. under a pressure of the order of 200–1500 pounds per square inch in the presence of so-called "solid phosphoric acid" catalysts, as described in United States Patent No. 1,993,513 and others. This solid phosphoric acid catalyst may be made by the successive steps of (1) mixing the phosphoric acid with a finely divided and relatively inert, generally siliceous, carrying material, such as, for example, diatomaceous earth to form a rather wet paste (the acid ordinarily being in major proportion by weight); (2) calcining at a temperature of the order of 600–932° F., to produce a solid cake; (3) grinding and sizing to produce particles of usable mesh; and (4) rehydrating the catalyst granules at a temperature of the order of 450–550° F. under substantially atmospheric pressure to produce an acid composition corresponding to optimum polymerizing activity. This procedure may be varied by forming particles from the original paste by extrusion or pelleting methods and following with the calcining and rehydrating steps. In the reactions taking place during calcining it is evident that some of the acid is "fixed" on the carrier and that some metaphosphoric acid, which is substantially without polymerizing activity, is formed. The rehydrating step evidently produces an acid composition corresponding closely to the pyro-acid having a formula $H_4P_2O_7$ and corresponding to the double oxide formula $P_2O_5 2H_2O$.

The solid phosphoric acid catalysts preferred for use in the present invention are characterized by the fact that they are precalcined before use both to fix the composition of the acid and to form particles of a granular structure capable of withstanding the conditions of service to which they are subjected. When these catalysts become coated with carbonaceous deposits they can be reactivated by oxidation with air, or with gas mixtures of controlled oxygen concentration at temperatures of the approximate order of 800–1000° F., followed by contacting with superheated steam at about 450–550° F., under atmospheric pressure to rehydrate the acid to the most desirable composition. Rehydration at higher temperatures may be made under steam pressure corresponding to approximately the water vapor pressure of the catalyst at the operating temperature.

Polymerization of the olefin content of such gases as are produced by the pyrolysis of butane may be effected by passing the gases through a reactor containing a section or several sections of the solid catalyst at a rate consistent with the production of a good yield of liquid products. Following the polymerization step, the total products may be fractionated to separate a stabilized gasoline from unconverted gases and relatively high boiling liquid products. The gaseous products may be subjected to further cracking to produce additional quantities of gaseous olefins and the relatively high boiling polymers may be used as absorption oil for separating butanes from lower boiling gases.

Sulfuric acid is another material which may be used as catalyst in the polymerization of normally gaseous olefins, particularly butenes, to produce high yields of normally liquid polymers hydrogenatable to paraffin fractions of high octane number. This type of polymerization is effected conveniently by contacting the butene-containing fraction with sulfuric acid of 60–70% concentration at a temperature in the approximate range of 100–200° F. under a pressure of the order of 150–600 pounds per square inch. Under these conditions 4-carbon atom hydrocarbon fractions containing both isobutene and normal butenes yield interpolymers of relatively high octane number. Polymers of isobutene may be produced from the same charging stock by contacting it with 60–70% sulfuric acid at approximately 75–100° F. to absorb isobutene in the sulfuric acid followed by heating the sulfuric acid and absorbed isobutene to approximately 200° F. to effect formation of polymers.

For the purpose of illustrating the combination of steps characteristic of one form of the present invention the attached drawing shows diagrammatically a typical process flow for producing gasoline from saturated gaseous hydrocarbons absorbed from natural or casing head gases.

Referring to the drawing, a rich oil from a natural gasoline plant absorber containing dissolved hydrocarbons may be introduced through line 1 to stripping zone 2 which may comprise a fractional distilling column of adequate design by which dissolved hydrocarbons may be separated from the higher boiling material utilized as absorption oil.

The lean absorption oil may be returned through line 3 to the absorbing plant, not shown, while the gaseous and liquid hydrocarbons separated therefrom in stripping zone 2 may be withdrawn through line 4 to stabilizing zone 5 which may comprise a fractional distilling column from which gaseous hydrocarbons may be separated from normally liquid products of gasoline boiling range. Said liquid products may be withdrawn from stabilizing zone 5 through line 6 to storage, while the gaseous hydrocarbons may be conducted through line 7 to depropanizing zone 8 which may comprise fractional distillation equipment of adequate design for separating $C_3$ and lighter gases from a substantially butane fraction. The $C_3$ and lighter gases may be discharged from depropanizing zone 8 through line 9 for use as fuel or for another purpose.

The butane fraction may be withdrawn from depropanizing zone 8 and passed through line 10 to cracking zone 11 which may comprise a tubular reactor or plurality of such reactors maintained at a temperature in the approximate range of 900–1200° F. to yield a product containing butenes, unconverted butane, lower boiling paraffin and olefin gases and some normally liquid materials generally containing olefinic and aromatic hydrocarbons and commonly classed as pyrolytic polymers. From cracking zone 11 the cracked products may be passed by way of line 12 to de-ethanizing zone 13 for separating $C_2$ and lighter gases. De-ethanizing zone 13 may comprise absorbing and stripping columns in which pyrolytic polymers may be utilized as absorbent for butanes and butenes. The $C_2$ and lighter gases remaining unabsorbed in de-ethanizing zone 13 may be conducted thence through lines 14 and 9 to be used as fuel or all or a portion thereof may be conducted through line 23 to processes in which ethylene may be desirable as a charging material.

From de-ethanizing zone 13 the pyrolytic polymers containing absorbed hydrocarbons may be conducted through line 15 to separating zone 16 which may comprise a fractional distilling column by which $C_3$ and heavier olefins and paraffins may be separated and conducted thence through line 17 to polymerizing zone 18, while the normally liquid products comprising essentially pyrolytic polymers may be recycled through line 19 to line 1 to commingle with the absorption oil containing dissolved paraffinic hydrocarbons being charged through line 1 already mentioned. A portion of the material being conducted through line 19 may be discharged therefrom through line 20 to de-ethanizing zone 13 for further absorption use therein.

Polymerizing zone 18 may comprise a reactor or plurality of reactors containing a granular calcined composite of an acid of phosphorus and a siliceous absorbent operated under conditions of temperature and pressure adequate to effect formation of liquid polymers from normally gaseous olefins. The products from polymerizing zone 18 may be discharged therefrom through line 21 and therein conducted to line 4, already mentioned, through which incoming gaseous and liquid hydrocarbons may be introduced to stabilizing zone 5 in which liquid hydrocarbons contained in the original charge and those produced by thermal and catalytic polymerization may be separated as a gasoline fraction which may be withdrawn through line 6 to storage as hereinabove indicated.

When desired all or a portion of the material passing through line 17 may be conducted through line 22 to other processes in which it may be utilizable.

The following specific example is presented as illustrative of one form of the process as it may be conducted using a process flow as hereinabove described. A hydrocarbon fraction containing approximately 30 mole per cent isobutane and 70 mole per cent n-butane obtained from natural gas by absorption, stripping, and distillation treatments may give a gasoline yield of 350 barrels, comprising approximately 100 barrels of pyrolytic polymer and 250 barrels of catalytic polymer based upon 1000 barrels of butane charged. Such typical operation may comprise cracking the butane fraction at 1000° F. under a pressure of 750 pounds per square inch to produce an olefin-containing gas and pyrolytic polymers, followed by contacting such olefin-containing gas at 475° F. under a pressure of 1000 pounds per square inch with a calcined composite of pyrophosphoric acid and diatomaceous earth to produce normally liquid polymers. A mixture of pyrolytic and catalytic polymers from the process of this invention may be blended, as hereinabove indicated, with the natural gasoline recovered from the natural or casing head gases to produce a motor fuel of high octane number.

The foregoing description of the invention and the illustrative example serve to define its character and utility, but the exact details set forth are not to be construed as imposing undue limitations upon the generally broad scope of the invention.

I claim as my invention:

1. In the recovery of butanes from natural and casing head gases by absorption thereof in an absorber oil, the method of producing more valuable products from the recovered butanes which comprises combining with the enriched absorber oil normally liquid polymers formed as hereinafter set forth, vaporizing from the resultant mixture gasoline boiling hydrocarbons and absorbed gases, commingling with the resultant vapor-gas mixture polymerization products formed as hereinafter set forth, fractionating the mixture thus formed to separate therefrom a gasoline distillate and a butane fraction, recovering said distillate, cracking said butane fraction to form olefinic gas and normally liquid polymers, combining at least a portion of the latter with said enriched absorber oil as aforesaid, subjecting the olefinic gas to catalytic polymerization and commingling the resultant products with said vapor-gas mixture as aforesaid.

2. In the recovery of butanes from natural and casing head gases by absorption thereof in an absorber oil, the method of producing more valuable products from the recovered butanes which comprises combining with the enriched absorber oil normally liquid polymers formed as hereinafter set forth, vaporizing from the resultant mixture gasoline boiling hydrocarbons and absorbed gases, commingling with the resultant vapor-gas mixture polymerization products formed as hereinafter set forth, fractionating the mixture thus formed to separate therefrom a gasoline distillate and a butane fraction, recovering said distillate, cracking said butane fraction at a temperature of from about 900 to about 1200° F. and under a pressure of from about 200 to about 1000 pounds per square inch to form olefinic gas and normally liquid polymers, combining at least a portion of the latter with said enriched absorber oil as aforesaid, subjecting the olefinic gas to catalytic polymerization and commingling the resultant products with said vapor-gas mixture as aforesaid.

3. The process set forth in claim 1 further characterized in that the olefinic gas is subjected to polymerization in the presence of a catalyst comprising phosphoric acid.

4. The process set forth in claim 1 further characterized in that the olefinic gas is subjected to polymerization in the presence of a catalyst comprising sulfuric acid.

5. In the recovery of butane from absorber oil enriched with natural or casing head gases, the method of producing more valuable products from the recovered butane which comprises stripping the enriched absorber oil of its butane and gasoline boiling range hydrocarbon content, separating a butane fraction from the products of the stripping step, subjecting said butane fraction to a thermal conversion treatment to form liquid polymer and olefinic gases, separating the liquid polymer from the olefinic gases, combining said liquid polymer with the enriched absorber oil for treatment in said stripping step, subjecting the olefinic gases to catalytic conversion to form a liquid product boiling in the range of gasoline, and combining the products from the last mentioned conversion step with the products of the stripping step for treatment in said separating step.

SAMUEL S. ALLENDER.